Aug. 6, 1935.    W. B. MILLER    2,010,605
WELDING ROD
Filed Aug. 10, 1933
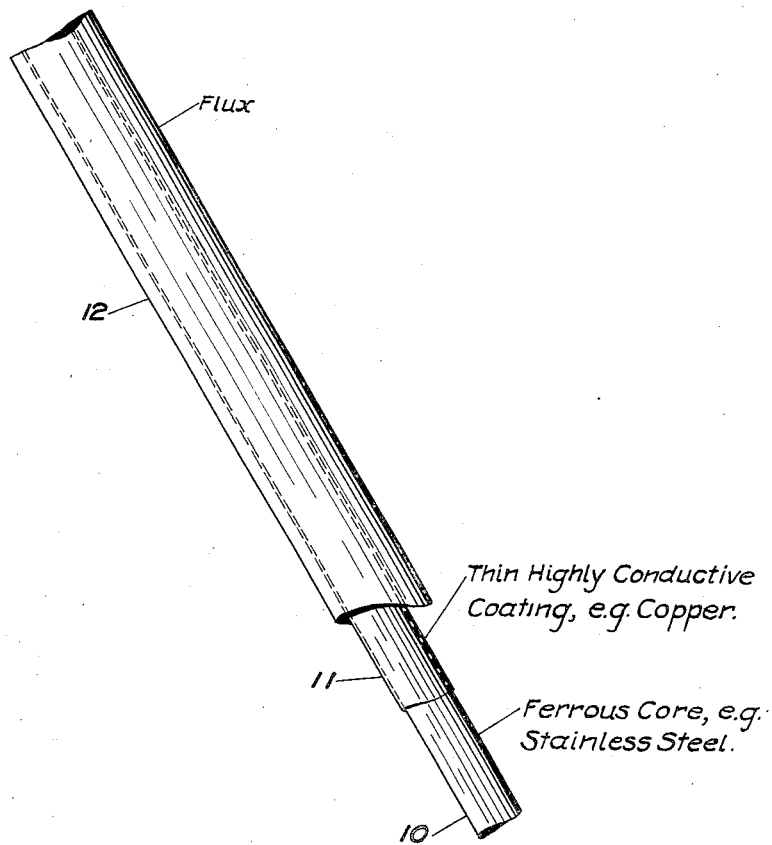
INVENTOR
WILBER B. MILLER
BY
ATTORNEY Patented Aug. 6, 1935

2,010,605

UNITED STATES PATENT OFFICE 2,010,605

WELDING ROD

Wilber B. Miller, Flushing, N. Y., assignor to Oxweld Acetylene Company, a corporation of West Virginia Application August 10, 1933, Serial No. 684,493

7 Claims. (Cl. 219—8)

This invention relates to welding rods and more especially to welding rods for arc welding in which a ferrous deposit is produced. An object of my invention is to produce a welding rod which will give a uniform deposit of a ferrous alloy, such, for example, as stainless steel, without the difficulties which have heretofore been encountered in the use of welding rods of such alloys. A further object of my invention is to make possible the use of a longer welding rod than has been possible in prior practice with alloys of this type. Still another object of my invention is to produce a welding rod using a core of a relatively highly electric resistant ferrous-alloy having a coating of flux thereon without danger of bringing the temperature of that part of the welding rod away from the weld to such a high temperature that the flux coating thereon will be damaged. These and other objects of my invention will be readily apparent from the accompanying specification having reference to the annexed drawing in which the single figure is a view of a welding rod illustrating one embodiment of my invention, a portion of the welding rod being broken away to show more clearly the manner in which it is constructed. In this figure I show an electrode adapted for arc welding comprising a core 10 of a ferrous-alloy having a thin electrically conductive coating 11 thereon. This is surrounded by a coating of flux material. In using my invention the flux material is preferably removed from one end of the electrode for a length of about one inch so that suitable contact can be made between the electrode holder and the highly conductive coating.

In welding stainless steels by the metallic arc welding process considerable difficulty has been encountered due to the heating up of the electrode or welding rod as a result of its high electrical resistance. Typical examples of such stainless steels are ferrous-alloys containing approximately 18% chromium and either 8% nickel or 8% manganese, with the balance substantially iron. However, these compositions are given merely as examples and are not to be considered as limiting my invention to the exact compositions herein set forth. Due to the relatively high electrical resistance the electrode becomes hot, in many instances red hot. As soon as the electrode becomes hot its flowing or melting characteristics change and the metal melts off in larger globules. To overcome this difficulty in the past it has been customary to use short electrodes, such as electrodes approximately 4 inches long, which are consumed before the unmelted electrode metal is heated up unduly by the electric current passing therethrough.

I have found that this heating up of electrodes, particularly those of the type containing 18% of chromium with 8% of nickel, manganese, or mixtures of nickel or manganese, can be reduced to an amount which will not adversely affect the performance of the electrode by applying a conductive coating to the electrode, such, for example, as a copper coating having a thickness of 0.001 inch. This coating is preferably applied by electroplating. After the conductive coating is applied the electrodes are coated with the usual flux mixtures necessary for stainless electrodes. By way of example of such a flux mixture the following is given:

| | Parts by weight |
|---|---|
| Fluorspar | 50 |
| Silica | 40 |
| Sodium borosilicate | 10 | with a binder of casein glue.

I have found that the conductivity of welding rods of approximately ⅛ inch diameter is increased by providing a coating of about 0.003 inch in thickness of copper to the extent indicated in the following table:

| Rod | Mhos per foot of rod |
|---|---|
| 18% chromium 8% nickel, with copper coating | 80 |
| 18% chromium 8% nickel, uncoated | 32 |
| 18% chromium 8% manganese, with copper coating | 138 |
| 18% chromium 8% manganese, uncoated | 33 |

It will be evident from the above that a large increase in electrical conductivity results from the application of a copper coating 0.003 inch thick.

Welding rods ⅛ inch in diameter of the above composition were coated with copper to a thickness 0.0015 inch and 12 inches long and similar uncoated welding rods were prepared. These were then coated with a flux of the composition set forth above. Welds were made with a current of 90 amperes. When the rods without the copper coating were half consumed, the upper part of the rod was hot enough to char the glue binder of the flux coating. The white coating on the rods coated with copper was still white when the rod was half consumed showing that the increased conductivity afforded by a copper coating 0.0015 inch thick was sufficient to prevent overheating of the electrode. With the rod provided with a copper coating more heat was developed at the arc, as was clearly shown by better and deeper penetration. The copper coated electrode melted off evenly and uniformly over its entire length while the unplated rod melted off in much larger globules as soon as it becomes overheated. Although coatings of copper as thin as 0.0005 inch in thickness show advantages, better results are obtained with rods having a copper coating between 0.001 inch and 0.010 inch in thickness. While electroplating has been found especially suitable as a means of coating electrodes with a highly electrical conductive coating other methods may be used. An example of such other means for applying the coating consists in casting or extruding a coating of conductive metal over a billet, rod or wire and reducing the coated metal to the necessary thickness by rolling or drawing through dies. While copper has been specifically mentioned the invention is not limited to the use of copper as a conductive coating since other metals having higher electrical conductivity than the core may be used. An example of another metal useful for this purpose is aluminum. Moreover, although stainless steel electrodes and especially ferrous-alloys containing 18% chromium with 8% of nickel and/or manganese have been specifically mentioned, the invention is not limited to this ferrous alloy as a core for the welding rod or electrode; the use of the high conductivity coating is particularly applicable to all high chromium electrodes containing more than about 4% chromium. The conductive coating on iron or steel electrodes has also been found to be efficacious where current densities higher than usual are used and this is particularly the case where the electrode is covered or coated with a flux coating which will blister or be otherwise damaged if it is excessively heated.

Throughout the specification I have referred to the flux coating as surrounding the copper coating. In the use of this terminology I do not wish to limit myself to a welding rod in which the copper coating is completely covered by the flux. The flux coating may be applied in strips, as for example in two strips, on opposite faces of the rod whereby an intermediate portion is left between the strips to form a contact when the electrode is used in machine welding. Also the flux material may be applied in intervals along the rod instead of in a continuous coating or in strips.

I claim:

1. A welding electrode having a core consisting of iron, approximately 18% chromium and approximately 8% of a metal selected from the group consisting of nickel and manganese, said core having a closely adherent coating of a highly electrical conductive metal surrounding it.

2. A welding electrode as claimed in claim 1 in which said highly conductive metal is selected from the group consisting of copper and aluminum.

3. A welding electrode comprising a stainless steel core, a highly conductive coating surrounding and adhering to said core and a coating of flux material surrounding said highly conductive coating.

4. A welding rod comprising a stainless steel core, a conductive coating of a metal selected from the group of copper and aluminum surrounding and adhering to said core and a coating of flux material surrounding said conductive coating.

5. A welding rod comprising a core predominantly iron having alloyed therewith chromium and a metal of the group consisting of nickel and manganese, said core having an adherent coating of highly conductive metal surrounding said core and a coating of flux material surrounding said conductive coating.

6. A welding electrode comprising a core predominantly iron having alloyed therewith approximately 18% chromium and 8% of a metal selected from a group consisting of nickel and manganese, a conductive layer of a metal selected from the group consisting of copper and aluminum surrounding and adhering to said core and a flux coating surrounding said conductive coating.

7. A welding electrode consisting of a ferrous alloy core, a coating of a highly conductive metal surrounding and adhering to said core and a coating of flux material surrounding said conductive coating, said flux material consisting of fluorspar 50 parts by weight, silica 40 parts by weight, sodium borosilicate 10 parts by weight, with a binder.

WILBER B. MILLER.